(12) United States Patent
Duan et al.

(10) Patent No.: US 11,930,073 B1
(45) Date of Patent: Mar. 12, 2024

(54) MAXIMIZING SYSTEM SCALABILITY WHILE GUARANTEEING ENFORCEMENT OF SERVICE LEVEL OBJECTIVES

(71) Applicant: International Business Machines Corporation, Armonk, NY (US)

(72) Inventors: Jun Duan, Mount Kisco, NY (US); Braulio Gabriel Dumba, White Plains, NY (US); Andrew John Anderson, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/971,084

(22) Filed: Oct. 21, 2022

(51) Int. Cl.
*G06F 15/173* (2006.01)
*G06F 18/21* (2023.01)
*H04L 67/1008* (2022.01)
*H04L 67/1012* (2022.01)

(52) U.S. Cl.
CPC ........ *H04L 67/1012* (2013.01); *G06F 18/217* (2023.01); *H04L 67/1008* (2013.01)

(58) Field of Classification Search
None
See application file for complete search history.

(56) References Cited

U.S. PATENT DOCUMENTS

| | | | |
|---|---|---|---|
| 9,412,075 B2 * | 8/2016 | Padala | G06F 9/45558 |
| 9,635,101 B2 * | 4/2017 | Mathur | G06F 11/3034 |
| 10,496,282 B1 | 12/2019 | Martin et al. | |
| 10,581,745 B2 | 3/2020 | Bastide et al. | |

OTHER PUBLICATIONS

Niu et al., "Workload Adaptation in Autonomic DBMSs," Proceedings of the 2006 Conference of the Center for Advanced Studies on Collaborative Research, Oct. 2006, pp. 1-14.
Anonymously, "Capacity Planning for Computing Clusters," ip.com, IPCOM000253673D, Apr. 23, 2018, pp. 1-9.
Scott et al., "QOS Minimum Throughput Guarantee—A Method to Detect Violations Using Deadlines and Report When a Guarantee is Met or Violated," ip.com, IPCOM000263127D, Jul. 31, 2020, pp. 1-6.
Wang et al., "SLO-Driven Task Scheduling in MapReduce Environments," 2013 10th Web Information System and Application Conference, Nov. 2013, pp. 308-313.

* cited by examiner

*Primary Examiner* — Wing F Chan
*Assistant Examiner* — Andrew Woo
(74) *Attorney, Agent, or Firm* — Shackelford, Bowen, McKinley & Norton, LLP; Robert A. Voigt, Jr.

(57) ABSTRACT

A computer-implemented method, system and computer program product for maximizing system scalability while guaranteeing enforcement of service level objectives. A request is received to access a backend database in a hierarchy of backend databases that includes heterogenous computing resources with a dynamic range of performance. Upon receiving the request, a reinforcement learning based filter determines if the request's frequency of access exceeds a cutoff frequency. If the received request is not filtered, but instead, is passed through the filter, then one of the backend databases in the hierarchy is selected. Such a selection is made by a load balancer that is trained using reinforcement learning to select the optimal backend database taking into consideration the storage size and speed of the backend databases as well as taking into consideration the user-specified service level objective to be met by the request to guarantee enforcement of such a service level objective.

20 Claims, 6 Drawing Sheets

MAXIMIZING SYSTEM SCALABILITY WHILE GUARANTEEING ENFORCEMENT OF SERVICE LEVEL OBJECTIVES

TECHNICAL FIELD

The present disclosure relates generally to database management systems controlling backend databases, and more particularly to maximizing system scalability while guaranteeing enforcement of service level objectives by implementing a storage backend hierarchy and applying request filter techniques combined with reinforcement learning.

BACKGROUND

Backend databases are databases that are accessed by users indirectly through an external application rather than by application programming stored within the database itself or by low level manipulation of the data.

A database is an organized collection of structured information, or data, typically stored electronically in a computer system. A database is usually controlled by a database management system (DBMS).

Various database management systems have attempted to improve scalability via the use of multiple backend databases. Scalability is the ability to expand or contract the capacity of system resources in order to support the changes in traffic, such as changes in queries-per-second (QPS). Queries-per-second (QPS) is a measure of how much traffic a particular query server is handling at a given time.

Many of these requests include user-specified service level objectives. A service level objective is a key element of a service level agreement between a service provider and a customer. A service level agreement is a commitment between a service provider and a client. For example, the service level agreement may include aspects of the service (e.g., quality, availability, responsibilities) that are agreed between the service provider and the service user. Service level objectives are agreed upon between the service provider and the customer as a means of measuring the performance of the service provider. Such service level objectives are composed of one or more service level indicators (or quality of service measurements) that are combined to produce the service level objective achievement value.

Unfortunately, such database management systems cannot both improve the scalability while also simultaneously guaranteeing user-specified service level objectives.

SUMMARY

In one embodiment of the present disclosure, a computer-implemented method for maximizing system scalability while guaranteeing enforcement of service level objectives comprises training a load balancer using reinforcement learning to select a backend database in a hierarchy of backend databases that maximizes system scalability while guaranteeing enforcement of a user-specified service level objective, where the hierarchy of backend databases comprises a plurality of backend databases differing in speed and size. The method further comprises receiving a request from a computing device to access a backend database in the hierarchy of backend databases, where the request is to meet a service level objective which corresponds to a target level of service as measured by a service level indicator. The method additionally comprises selecting, by the trained load balancer, one of the plurality of backend databases in the hierarchy of backend databases to process the request that maximizes system scalability while guaranteeing enforcement of the service level objective.

In this manner, system scalability is improved while also simultaneously guaranteeing user-specified service level objectives. In particular, such system scalability is improved while also simultaneously guaranteeing user-specified service level objectives by implementing a backend storage that contains a hierarchy of backend databases, where such a hierarchy includes heterogenous computing resources with a dynamic range of performance (e.g., latency may span from microseconds to milliseconds). Such backend databases in the hierarchy of backend databases differ in terms of storage size and speed (latency). A load balancer may then be trained using reinforcement learning to select the optimal backend database in the hierarchy of backend databases based on speed and storage size so that systems are not locked into using a single storage backend database for all persisted data while also guaranteeing enforcement of the user-specified service level objective to be met by the request.

In another embodiment of the present disclosure, a computer program product for maximizing system scalability while guaranteeing enforcement of service level objectives, where the computer program product comprises one or more computer readable storage mediums having program code embodied therewith, where the program code comprising programming instructions for training a load balancer using reinforcement learning to select a backend database in a hierarchy of backend databases that maximizes system scalability while guaranteeing enforcement of a user-specified service level objective, where the hierarchy of backend databases comprises a plurality of backend databases differing in speed and size. The program code further comprises the programming instructions for receiving a request from a computing device to access a backend database in the hierarchy of backend databases, where the request is to meet a service level objective which corresponds to a target level of service as measured by a service level indicator. The program code additionally comprises the programming instructions for selecting, by the trained load balancer, one of the plurality of backend databases in the hierarchy of backend databases to process the request that maximizes system scalability while guaranteeing enforcement of the service level objective.

In this manner, system scalability is improved while also simultaneously guaranteeing user-specified service level objectives. In particular, such system scalability is improved while also simultaneously guaranteeing user-specified service level objectives by implementing a backend storage that contains a hierarchy of backend databases, where such a hierarchy includes heterogenous computing resources with a dynamic range of performance (e.g., latency may span from microseconds to milliseconds). Such backend databases in the hierarchy of backend databases differ in terms of storage size and speed (latency). A load balancer may then be trained using reinforcement learning to select the optimal backend database in the hierarchy of backend databases based on speed and storage size so that systems are not locked into using a single storage backend database for all persisted data while also guaranteeing enforcement of the user-specified service level objective to be met by the request.

In a further embodiment of the present disclosure, a system comprises a memory for storing a computer program for maximizing system scalability while guaranteeing enforcement of service level objectives. The processor is configured to execute program instructions of the computer program comprising training a load balancer using reinforcement learning to select a backend database in a hierarchy of backend databases that maximizes system scalability while guaranteeing enforcement of a user-specified service level objective, where the hierarchy of backend databases comprises a plurality of backend databases differing in speed and size. The processor is further configured to execute the program instructions of the computer program comprising receiving a request from a computing device to access a backend database in the hierarchy of backend databases, where the request is to meet a service level objective which corresponds to a target level of service as measured by a service level indicator. The processor is additionally configured to execute the program instructions of the computer program comprising selecting, by the trained load balancer, one of the plurality of backend databases in the hierarchy of backend databases to process the request that maximizes system scalability while guaranteeing enforcement of the service level objective.

In this manner, system scalability is improved while also simultaneously guaranteeing user-specified service level objectives. In particular, such system scalability is improved while also simultaneously guaranteeing user-specified service level objectives by implementing a backend storage that contains a hierarchy of backend databases, where such a hierarchy includes heterogenous computing resources with a dynamic range of performance (e.g., latency may span from microseconds to milliseconds). Such backend databases in the hierarchy of backend databases differ in terms of storage size and speed (latency). A load balancer may then be trained using reinforcement learning to select the optimal backend database in the hierarchy of backend databases based on speed and storage size so that systems are not locked into using a single storage backend database for all persisted data while also guaranteeing enforcement of the user-specified service level objective to be met by the request.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
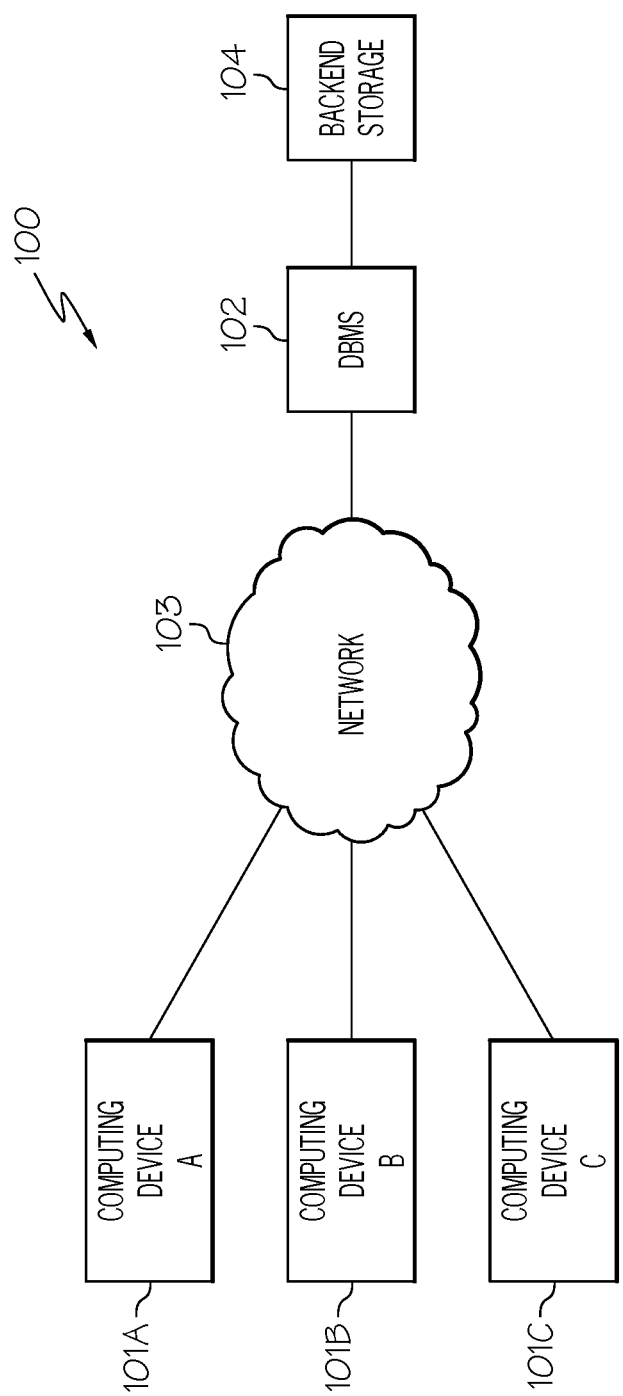
FIG. 1 illustrates a communication system for practicing the principles of the present disclosure in accordance with an embodiment of the present disclosure.

As stated in the Background section, various database management systems have attempted to improve scalability via the use of multiple backend databases. Scalability is the ability to expand or contract the capacity of system resources in order to support the changes in traffic, such as changes in queries-per-second (QPS). Queries-per-second (QPS) is a measure of how much traffic a particular query server is handling at a given time.

Many of these requests include user-specified service level objectives. A service level objective is a key element of a service level agreement between a service provider and a customer. A service level agreement is a commitment between a service provider and a client. For example, the service level agreement may include aspects of the service (e.g., quality, availability, responsibilities) that are agreed between the service provider and the service user. Service level objectives are agreed upon between the service provider and the customer as a means of measuring the performance of the service provider. Such service level objectives are composed of one or more service level indicators (or quality of service measurements) that are combined to produce the service level objective achievement value.

Unfortunately, such database management systems cannot both improve the scalability while also simultaneously guaranteeing user-specified service level objectives.

The embodiments of the present disclosure provide a means for both improving the system scalability while also simultaneously guaranteeing user-specified service level objectives by implementing a backend storage that contains a hierarchy of backend databases, where such a hierarchy includes heterogenous computing resources with a dynamic range of performance (e.g., latency may span from microseconds to milliseconds). Such backend databases in the hierarchy of backend databases differ in terms of storage size and speed (latency). Furthermore, embodiments of the present disclosure improve the system scalability while also simultaneously guaranteeing user-specified service level objectives by training a load balancer using reinforcement learning to select the optimal backend database in the hierarchy of backend databases based on speed and storage size so that systems are not locked into using a single storage backend database for all persisted data as well as training a filter using reinforcement learning to filter (squash) those requests (e.g., write requests) with a frequency greater than a cutoff frequency so that a maximum amount of bandwidth is saved for scalability. A further description of these and other features will be provided below.

In some embodiments of the present disclosure, the present disclosure comprises a computer-implemented method, system and computer program product for maximizing system scalability while guaranteeing enforcement of service level objectives. In one embodiment of the present disclosure, a request is received from a computing device to access a backend database in a hierarchy of backend databases. A "backend database," as used herein, is a database that is accessed by users indirectly through an external application rather than by application programing stored within the database itself or by low level manipulation of the data. A "hierarchy" (also referred to as a "storage device hierarchy") of backend databases, as used herein, refers to a group of backend databases that have different costs for storage data, different amounts of data stored and different speeds of accessing the data. For example, the hierarchy of backend databases may include different types of databases, such as in-memory databases or traditional databases. Furthermore, the received request is to meet a user-specified service level objective which corresponds to a target level of service as measured by a service level indicator. Examples of such service level objectives include disaster recovery time, application availability, live communication response time, first call resolution rate, application maintenance, etc. In one embodiment, the service level objective to be met by the request is located in the request body (payload) of the request. Upon receiving the request, a reinforcement learning based filter determines if the request's frequency of access exceeds a cutoff frequency. The "cutoff frequency," as used herein, refers to the access rate at which those requests that exceed such an access rate are filtered or squashed so that such requests are not processed. In one embodiment, the optimal cutoff frequency is learned via reinforcement learning so that a maximum amount of bandwidth is saved for scalability. If the received request is not filtered (squashed), but instead, is passed through the filter, then one of the backend databases in the hierarchy of backend databases is selected to process the request that maximizes system scalability while guaranteeing enforcement of the user-specified service level objective to be met by the request. In one embodiment, such a selection is made by a reinforcement learning based load balancer that is trained using reinforcement learning to select the optimal backend database taking into consideration the storage size and speed of the backend databases in the hierarchy of backend databases so that systems are not locked into using a single storage backend database for all persisted data as well as taking into consideration the user-specified service level objective to be met by the request to guarantee enforcement of such a service level objective. In this manner, system scalability is improved while also simultaneously guaranteeing user-specified service level objectives.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a database management system (DBMS) 102 via a network 103. Furthermore, as illustrated in FIG. 1, database management system 102 is connected to a backend storage 104, which includes a hierarchy of backend databases as discussed further below.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and database management system 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., structured query language (SQL) query, query JSON (JavaScript® Object Notation) objects) to database management system 102 to update, insert, delete, etc. information from or in a backend database of backend storage 104. Such a query will be processed by database management system 102, such as storing and retrieving data as requested by the user.

In one embodiment, database management system 102 is configured to maintain backend storage 104, which includes a hierarchy of backend databases.

A "backend database," as used herein, is a database is accessed by users indirectly through an external application rather than by application programing stored within the database itself or by low level manipulation of the data.

A "hierarchy" (also referred to as a "storage device hierarchy") of backend databases, as used herein, refers to a group of backend databases that have different costs for storage data, different amounts of data stored and different speeds of accessing the data. That is, the hierarchy of backend databases includes heterogenous computing resources with a dynamic range of performance (e.g., latency may span from microseconds to milliseconds). For example, the hierarchy of backend databases may include different types of databases, such as in-memory databases or traditional databases.

"In-memory databases," as used herein, refer to purpose-built databases that rely primarily on memory for data storage. In-memory databases are designed to enable minimal response times by eliminating the need to access disks. In-memory databases can persist data on disk by storing each operation in a log or by taking snapshots. Since in-memory databases have minimal response times (fast speed in accessing data), in-memory databases are ideal for applications that require microsecond response times or have large spikes in traffic, such as gaming leaderboards, session stores and real-time analytics.

A "traditional database," as used herein, refers to a database with a centralized database architecture used to store and maintain the data in a fixed format or fields in a file. A traditional databases stores data on disks or solid-state drives. Since all data is stored on disks or solid-state drives, the access speed is slower than in-memory databases. However, traditional databases are used to handle large volumes of structured data on a regular basis. Hence, traditional databases have a larger storage size than in-memory databases.

Referring again to database management system 102, in one embodiment, database management system 102 filters queries (e.g., write requests) issued by the user of computing device 101 based on the frequency of access using a filter trained using reinforcement learning. "Reinforcement learning," as used herein, refers to training agents, such as a reinforcement learning based filter (discussed further below) and a reinforcement learning based load balancer (discussed further below) to maximize the notion of a cumulative reward. In one embodiment, such a reward corresponds to user-specified service-level indicators. A "service-level indicator," as used herein, refers to the metric used to measure the level of service provided to end users (e.g., availability, latency, throughput). Service level objectives are the targeted levels of service, measured by service-level indicators.

In one embodiment, a filter (reinforcement learning based filter) is trained to filter (squash) those requests (e.g., write requests) with a frequency that exceeds a cutoff frequency so that the bandwidth is efficiently used to support more queries. In one embodiment, such a "cutoff frequency" is automatically and dynamically tuned using reinforcement learning so as to appropriately consider both latency and congestion. The "cutoff frequency," as used herein, refers to the access rate at which those requests that exceed such an access rate are filtered or squashed so that such requests are not processed by backend storage 104. "Latency," as used herein, refers to how much time it takes for a data packet to travel from one designated point to another. "Congestion," as used herein, refers to a reduced quality of service that results when a node or link is carrying more data than it can handle. Typical effects include queueing delay, packet loss or the blocking of new connections. By learning the optimal cutoff frequency via reinforcement learning, a maximum amount of bandwidth is saved for scalability. Furthermore, using reinforcement learning, such filtered traffic satisfies the constraints imposed by the service level objectives of the requests.

In one embodiment, database management system 102 includes a load balancer that is trained using reinforcement learning (reinforcement learning based load balancer) to dispatch requests to the appropriately selected backend database in the hierarchy of backend databases. As previously discussed, the hierarchy of backend databases includes a group of backend databases that have different costs for storage data, different amounts of data stored and different speeds of accessing the data. For example, the hierarchy of backend databases may include different types of databases, such as in-memory databases or traditional databases. As a result, the reinforcement learning based load balancer is trained to optimally select the backend database taking into consideration the storage size and speed of the backend databases in the hierarchy of backend databases so that systems are not locked into using a single storage backend database for all persisted data while also guaranteeing enforcement of the user-specified service level objectives to be met by the requests from the users of computing devices 101.

A more detailed description of these and other features will be provided further below. Furthermore, a description of the software components of database management system 102 as well as the components of backend storage 104 is provided below in connection with FIG. 2 and a description of the hardware configuration of database management system 102 is provided further below in connection with FIG. 3.

System 100 is not to be limited in scope to any one particular network architecture. System 100 may include any number of computing devices 101, database management systems 102, networks 103 and backend storages 104.

Figure 2:
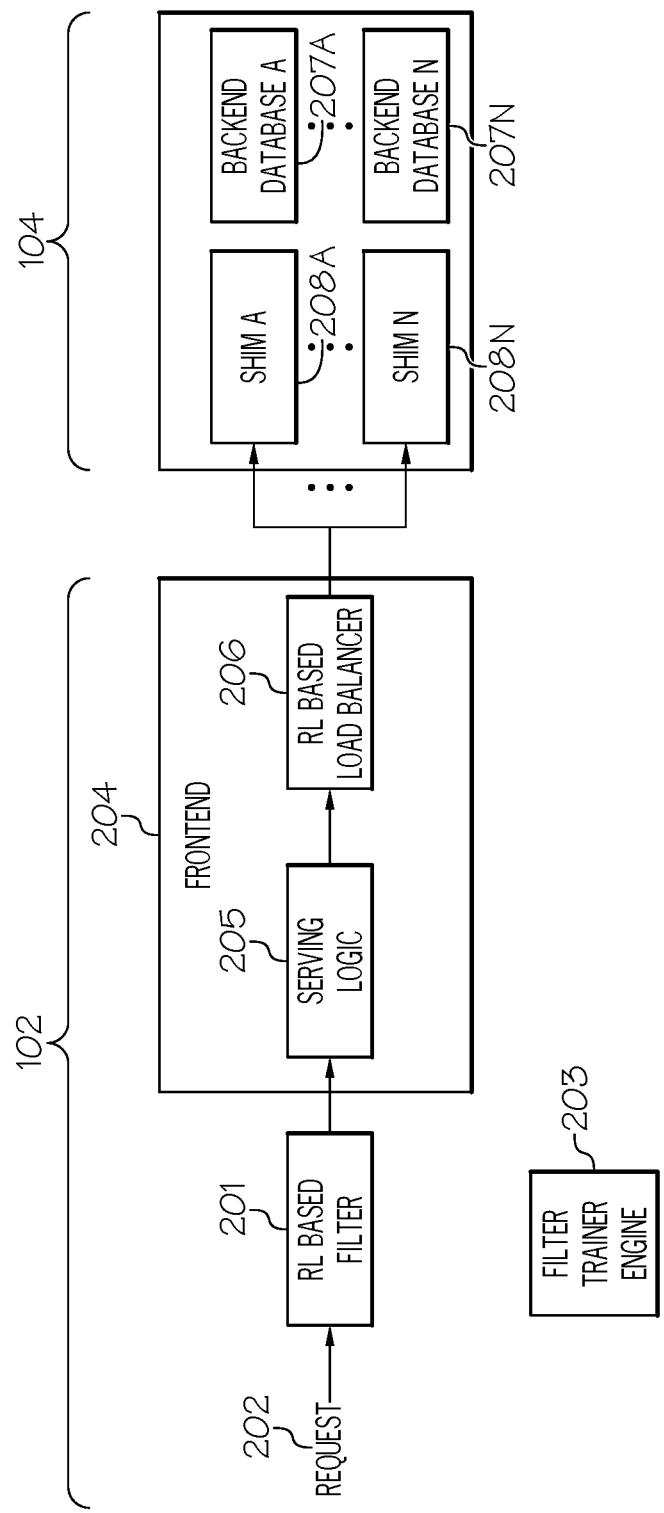
FIG. 2 is a diagram of the software components used by the database management system to maximize system scalability while guaranteeing enforcement of user-specified service level objectives as well as the components of the backend storage in accordance with an embodiment of the present disclosure.

Referring now to FIG. 2, in conjunction with FIG. 1, FIG. 2 is a diagram of the software components used by database management system 102 to maximize system scalability while guaranteeing enforcement of user-specified service level objectives as well as the components of backend storage 104 in accordance with an embodiment of the present disclosure.

As shown in FIG. 2, database management system 102 includes a reinforcement learning (RL) based filter 201 configured to filter queries/requests 202 (e.g., write requests) issued by the user of computing device 101 based on the frequency of access. "Frequency of access," as used herein, refers to the rate at which a request (e.g., SELECT column1, column2 FROM table1, table2 WHERE column2='value') is utilized to access a backend database.

In one embodiment, filter 201 is trained by filter trainer engine 203 of database management system 102 to filter (squash) those requests 202 (e.g., write requests) with a frequency of access that exceeds a cutoff frequency so that the bandwidth is efficiently used to support more queries. In one embodiment, such a "cutoff frequency" is automatically and dynamically tuned using reinforcement learning so as to appropriately consider both latency and congestion. The "cutoff frequency," as used herein, refers to the access rate at which those requests that exceed such an access rate are filtered or squashed so that such requests are not processed by backend storage 104. "Latency," as used herein, refers to how much time it takes for a data packet to travel from one designated point to another. "Congestion," as used herein, refers to a reduced quality of service that results when a node or link is carrying more data than it can handle. Typical effects include queueing delay, packet loss or the blocking of new connections. By learning the optimal cutoff frequency via reinforcement learning, a maximum amount of bandwidth is saved for scalability. Furthermore, using reinforcement learning, such filtered traffic satisfies the constraints imposed by the user-specified service level objectives to be met by the requests.

As discussed above, filter 201 is trained by filter trainer engine 203 to filter (squash) those requests 202 (e.g., write requests) with a frequency of access that exceeds a cutoff frequency so that the bandwidth is efficiently used to support more queries. As a result, in one embodiment, filter 201 functions as a low pass filter. In one embodiment, infrequent updates to application programming interface (API) endpoints (point at which an API connects with the software program) are allowed to pass through filter 201. Conversely, frequent updates to API endpoints are filtered (squashed) by filter 201. In one embodiment, filter trainer engine 203 utilizes various software tools to design filter 201 to function as a low pass filter including, but not limited to, FilterLab®, Filter Solutions®, FilterPro, etc.

In one embodiment, by having a higher cutoff frequency, there is a fast convergence since more traffic is allowed to pass through filter 201 to be handled by frontend 204 as discussed further below. Conversely, by having a lower cutoff frequency, there is a slow convergence since less traffic is allowed to pass through filter 201 to be handled by frontend 204 as discussed further below.

In one embodiment, filter 201 is trained by filter trainer engine 203 to filter (squash) those requests 202 (e.g., write requests) with a frequency of access that exceeds a cutoff frequency using reinforcement learning. "Reinforcement learning," as used herein, refers to training agents, such as a reinforcement learning based filter 201 and a reinforcement learning based load balancer (discussed further below), to maximize the notion of a cumulative reward. An "agent," as used herein, refers to the sole decision-maker and learner. In one embodiment, such a reward corresponds to user-specified service-level indicators. A "service-level indicator," as used herein, refers to the metric used to measure the level of service provided to end users (e.g., availability, latency, throughput). "Service level objectives," as used herein, are the targeted levels of service, measured by service-level indicators. In one embodiment, such service level objectives are specified by the users of computing devices 101, who also specify which requests are to meet what service level objectives.

In one embodiment, filter trainer engine 203 is configured to train filter 201 using a reinforcement learning algorithm, such as Monte Carlo, Q-learning, SARSA (state-action-reward-state-action), DQN (deep Q network), DDPG (deep deterministic policy gradient), A3C (asynchronous advantage actor-critic algorithm), NAF (Q-learning and normalized advantage functions), TRPO (trust region policy optimization), PPO (proximal policy optimization), TD3 (twin delayed deep deterministic policy gradient), SAC (soft actor-critic), etc.

In one embodiment, various types of reinforcement learning may be utilized by filter trainer engine 203 to train filter 201, such as associative reinforcement learning, deep reinforcement learning, adversarial deep reinforcement learning, fuzzy reinforcement learning, inverse reinforcement learning, safe reinforcement learning, partially supervised reinforcement learning, etc. In one embodiment, the reinforcement learning algorithm utilized by filter trainer engine 203 is value-based. In a value-based approach, the goal is to maximize a value function, where the agent (filter 201) through a policy expects a long-term return of the current states. Furthermore, in one embodiment, the reinforcement learning algorithm utilized by filter trainer engine 203 is policy-based. In the policy-based approach, a strategy is developed, such as by an expert, that helps to gain maximum rewards in the future through possible actions performed in each state. Such policy-based approaches may be deterministic or stochastic. Additionally, in one embodiment, the reinforcement learning algorithm utilized by filter trainer engine 203 is model-based. In the model-based approach, a virtual model is created for the agent (filter 201) to help in learning to perform in each specific environment (where the agent learns and decides what actions to perform).

In one embodiment, in connection with training filter 201 by filter trainer engine 203 using reinforcement learning to filter requests 202 (e.g., write requests) that exceed a cutoff frequency, reinforcement learning based filter 201 corresponds to an agent that is trained using a reward and penalty mechanism. Filter 201 is trained to take the best possible action or path to gain maximum rewards and minimum penalties through observations in a specific situation. In one embodiment, filter 201 is an agent that is built to perceive and interpret the environment (where the agent learns and decides what actions to perform) in which it is placed. In one embodiment, filter 201 (agent) learns to perform a task (filter requests that exceed a cutoff frequency) through repeated trial and error interactions with the environment. Such a learning approach enables filter 201 (agent) to make a series of decisions that maximize a reward metric for the task without human intervention and without being explicitly programmed to achieve the task.

In one embodiment, filter trainer engine 203 continuously trains filter 201 as discussed above so that the cutoff frequency is continually updated (tuned) so that the maximize amount of bandwidth is saved for scalability.

Furthermore, as illustrated in FIG. 2, database management system 102 further includes a "frontend" 204 configured to select a backend database from the hierarchy of backend databases in backend storage 104 to process the request passed through filter 201 (i.e., those requests that were not filtered or squashed) so that scalability is improved and user-specified service level objectives are guaranteed simultaneously.

In one embodiment, "frontend" 204 includes serving logic 205 and load balancer 206 (reinforcement learning (RL) based load balancer). Serving logic 205 is configured to train load balancer 206 using reinforcement learning to dispatch requests to the appropriately selected backend database in the hierarchy of backend databases of backend storage 104.

Furthermore, as shown in FIG. 2, backend storage 104 includes a hierarchy of backend databases 207A-207N (identified as "Backend Database A" ... "Backend Database N" in FIG. 2, respectively). Backend databases 207A-207N may collectively or individually be referred to as backend databases 207 or backend database 207, respectively. As discussed above, a "backend database" 207, as used herein, is a database that is accessed by users indirectly through an external application rather than by application programing stored within the database itself or by low level manipulation of the data.

A "hierarchy" (also referred to as a "storage device hierarchy") of backend databases 207, as used herein, refers to a group of backend databases 207 that have different costs for storage data, different amounts of data stored and different speeds of accessing the data. That is, a hierarchy of backend databases includes heterogenous computing resources with a dynamic range of performance (e.g., latency may span from microseconds to milliseconds). For example, as shown in FIG. 2, the hierarchy of backend databases 207 have different speeds and sizes (storing different amounts of data). For instance, the hierarchy of backend databases 207 may include different types of databases 207, such as in-memory databases or traditional databases.

"In-memory databases," as used herein, refer to purpose-built databases that rely primarily on memory for data storage. In-memory databases are designed to enable minimal response times by eliminating the need to access disks. In-memory databases can persist data on disk by storing each operation in a log or by taking snapshots. Since in-memory databases have minimal response times (fast speed in accessing data), in-memory databases are ideal for applications that require microsecond response times or have large spikes in traffic, such as gaming leaderboards, session stores and real-time analytics.

A "traditional database," as used herein, refers to a database with a centralized database architecture used to store and maintain the data in a fixed format or fields in a file. A traditional databases stores data on disks or solid-state drives. Since all data is stored on disks or solid-state drives, the access speed is slower than in-memory databases. However, traditional databases are used to handle large volumes of structured data on a regular basis. Hence, traditional databases have a larger storage size than in-memory databases.

Hence, the hierarchy of backend databases 207 includes a dynamic range of performance, such as high-speed capacity-limited storage backend databases and low-speed, capacity-scalable storage backend databases.

Furthermore, as shown in FIG. 2, backend storage 104 includes shims 208A-208N (identified as "Shim A" . . . "Shim N" in FIG. 2, respectively) configured to transparently intercept API calls and change the arguments passed, handle the operation itself or redirect the operation elsewhere. Shims 208A-208N may collectively or individually be referred to as shims 208 or shim 208, respectively.

In one embodiment, each shim 208 is associated with a particular backend database 207. For example, shim 208A ("Shim A") is associated with backend database 207A ("Backend Database A") and so forth. By implementing shims 208 to transparently intercept API calls, shims 208 abstract away the heterogeneity (diversity) of backend databases 207. Furthermore, by implementing shims 208 to transparently intercept API calls, shims 208 expose uniform accessing primitives (basic interface or segment of code that can be used to build more sophisticated program elements or interfaces) to frontend 204.

As previously discussed, serving logic 205 is configured to train load balancer 206 using reinforcement learning to dispatch requests to the appropriately selected backend database 207 in the hierarchy of backend databases 207 of backend storage 104. In one embodiment, serving logic 205 trains load balancer 206 (also referred to as "reinforcement learning based load balancer") using reinforcement learning to optimally select backend database 207 taking into consideration the storage size and speed of backend databases 207 in the hierarchy of backend databases 207 to maximize system scalability while also guaranteeing enforcement of the user-specified service level objectives to be met by the requests. In one embodiment, serving logic 205 utilizes various software tools to design load balancer 206 to dispatch requests to the appropriately selected backend database 207 in the hierarchy of backend databases 207 of backend storage 104 including, but not limited to, Nginx®, HAProxy®, Kemp LoadMaster, ManageEngine® OpManager, etc.

As previously discussed, "reinforcement learning," as used herein, refers to training agents, such as reinforcement learning based load balancer 206, to maximize the notion of a cumulative reward. An "agent," as used herein, refers to the sole decision-maker and learner. In one embodiment, such a reward corresponds to user-specified service-level indicators. A "service-level indicator," as used herein, refers to the metric used to measure the level of service provided to end users (e.g., availability, latency, throughput). "Service level objectives," as used herein, are the targeted levels of service, measured by service-level indicators. In one embodiment, such service level objectives are specified by the users of computing devices 101, who also specify which requests are to meet what service level objectives.

In one embodiment, serving logic 205 is configured to train load balancer 206 using a reinforcement learning algorithm, such as Monte Carlo, Q-learning, SARSA (state-action-reward-state-action), DQN (deep Q network), DDPG (deep deterministic policy gradient), A3C (asynchronous advantage actor-critic algorithm), NAF (Q-learning and normalized advantage functions), TRPO (trust region policy optimization), PPO (proximal policy optimization), TD3 (twin delayed deep deterministic policy gradient), SAC (soft actor-critic), etc.

In one embodiment, various types of reinforcement learning may be utilized by serving logic 205 to train load balancer 206, such as associative reinforcement learning, deep reinforcement learning, adversarial deep reinforcement learning, fuzzy reinforcement learning, inverse reinforcement learning, safe reinforcement learning, partially supervised reinforcement learning, etc. In one embodiment, the reinforcement learning algorithm utilized by serving logic 205 is value-based. In a value-based approach, the goal is to maximize a value function, where the agent (load balancer 206) through a policy expects a long-term return of the current states. Furthermore, in one embodiment, the reinforcement learning algorithm utilized by serving logic 205 is policy-based. In the policy-based approach, a strategy is developed, such as by an expert, that helps to gain maximum rewards in the future through possible actions performed in each state. Such policy-based approaches may be deterministic or stochastic. Additionally, in one embodiment, the reinforcement learning algorithm utilized by serving logic 205 is model-based. In the model-based approach, a virtual model is created for the agent (load balancer 206) to help in learning to perform in each specific environment (where the agent learns and decides what actions to perform).

In one embodiment, in connection with training load balancer 206 by serving logic 205 using reinforcement learning to optimally select backend database 207 taking into consideration the storage size and speed of backend databases 207 in the hierarchy of backend databases 207 to maximize system scalability while also guaranteeing enforcement of the user-specified service level objectives, reinforcement learning based load balancer 206 corresponds to an agent that is trained using a reward and penalty mechanism. Load balancer 206 is trained to take the best possible action or path to gain maximum rewards and minimum penalties through observations in a specific situation. In one embodiment, load balancer 206 is an agent that is built to perceive and interpret the environment (where the agent learns and decides what actions to perform) in which it is placed. In one embodiment, load balancer 206 (agent) learns to perform a task (select backend database 207) through repeated trial and error interactions with the environment. Such a learning approach enables load balancer 206 (agent) to make a series of decisions that maximize a reward metric for the task without human intervention and without being explicitly programmed to achieve the task.

In one embodiment, serving logic 205 continuously trains load balancer 206 as discussed above so that load balancer's initial preference as to which backend database 207 should be selected to handle request 202 is continually updated so as to maximize system scalability while also simultaneously guaranteeing user-specified service level objectives.

In one embodiment, in connection with training load balancer 206 using reinforcement learning by serving logic 205, load balancer 206 (reinforcement learning based load balancer) utilizes predicates (hard rules defined by an expert) in which preferences (rules managed by the reinforcement learning agent) are a particular case. In one embodiment, such a preference may correspond to initially selecting a backend database 207 to handle the request issued by the user of computing device 101 based on the user-specified service level objective as identified in the request. In one embodiment, such preferences may be stored in a data structure (e.g., table) that includes a listing of backend databases 207 associated with service level objectives. Upon identifying the service level objective to be met by request 202 by serving logic 205, load balancer 206 may perform a look-up in the data structure for a listing of one or more backend databases 207 associated with such a service level objective. In one embodiment, such initial preferences are initially inputted in the data structure by an expert. In one embodiment, such a data structure resides within a storage device (e.g., memory, disk unit) of database management system 102.

As discussed above, the service level objective to be met by request 202 that is used to perform the look-up in the data structure discussed above is identified by serving logic 205. In one embodiment, serving logic 205 analyzes the received request 202 passed through filter 201 to identify the service level objective, which corresponds to a target level of service as measured by a service level indicator. Examples of such service level objectives include disaster recovery time, application availability, live communication response time, first call resolution rate, application maintenance, etc. In one embodiment, the service level objective to be met by the request passed through filter 201 is located in the request body (payload) where the name and description of the service level object is stored. In one embodiment, the request body is analyzed by serving logic 205 to obtain the requested service level objective. In one embodiment, serving logic 205 utilizes various software tools for identifying the service level objective to be met by the incoming request in the request body, including, but not limited to, cURL, HURL.it, Postman, HTTPie, etc.

Furthermore, in connection with training load balancer 206 using reinforcement learning by serving logic 205, load balancer 206 (reinforcement learning based load balancer) explores which backend databases 207 of the hierarchy of backend databases 207 meet the user-specified service level objective to be met by the request. In one embodiment, such an exploration covers a temporal distribution (e.g., peak hours and off-peak hours) of traffic (incoming requests 202 passed through filter 201) so that the observation of the service level indicators (quality of service measurements that are combined to produce the service level objective achievement value) are statistically significant.

In one embodiment, load balancer 206 may update or not update the initial preference of the particular backend database 207 (e.g., in-memory backend database) to handle request 202 issued by the user of computing device 101 based on the user-specified service level objective to be met by the request.

For example, suppose that the user specifies a service level objective for its online store web service to be 100 ms access latency for 99% of the queries, which is obtained from the request body of the request by serving logic 205. Suppose further that load balancer 206 has an initial preference of using etcd (works from memory and only stores data on disk in which the etcd stores data (both key and value) as a binary array) as backend database 207 in the hierarchy of backend databases 207 of backend storage 104 to service such a request. By exploiting the current preference, load balancer 206 finds that the initial preference meets the service level objective. By exploring, load balancer 206 learns that the PostgreSQL (open source object-relational database) backend database also meets the service level objective. The preference may then be updated for the online store service to now use PostgreSQL for better scalability. As a result, PostgreSQL is selected (final selection) as backend database 207 to handle the request. Consequently, data is migrated from the online store service from etcd to PostgreSQL.

In another example, suppose that the user specifies a service level objective for its assembly line monitoring web service to be 50 ms access latency for 99% of the queries, which is obtained from the request body of the request by serving logic 205. Suppose further that load balancer 206 has an initial preference of using PostgreSQL (open source object-relational database) as backend database 207 in the hierarchy of backend databases 207 of backend storage 104 to service such a request. By exploiting the current preference, load balancer 206 finds that the initial preference violates the service level objective. By exploring, load balancer 206 learns that the etcd (works from memory and only stores data on disk in which the etcd stores data (both key and value) as a binary array) meets the service level objective. The preference may then be updated for the assembly line monitoring service to now use etcd to meet the service level objective. As a result, etcd is selected (final selection) as backend database 207 to handle the request. Consequently, data is migrated from the assembly line monitoring service from PostgreSQL to etcd.

In one embodiment, such initial preference as to which backend database 207 is to be initially selected by load balancer 206 is continually updated using machine learning based on patterns of access to backend databases 207.

In one embodiment, serving logic 205 uses a machine learning algorithm (e.g., supervised learning) to train a machine learning model to select the initial preference as to which backend database 207 is to be selected by load balancer 206. In one embodiment, such training is based on sample data consisting of access patterns to backend databases 207 as previously determined by the reinforcement learning trained load balancer 206.

Such sample data is referred to herein as the "training data," which is used by the machine learning algorithm to make predictions or decisions as to the initial preference as to which backend database 207 is to be selected by load balancer 206. The algorithm iteratively makes predictions on the training data as to the initial preference as to which backend database 207 is to be selected by load balancer 206 until the predictions achieve the desired accuracy as determined by an expert. Examples of such learning algorithms include nearest neighbor, Naïve Bayes, decision trees, linear regression, support vector machines and neural networks.

A further description of these and other features is provided below in connection with the discussion of the method for maximizing system scalability while guaranteeing enforcement of user-specified service level objectives.

Prior to the discussion of the method for maximizing system scalability while guaranteeing enforcement of user-specified service level objectives, a description of the hardware configuration of database management system 102 (FIG. 1) is provided below in connection with FIG. 3.

Figure 3:
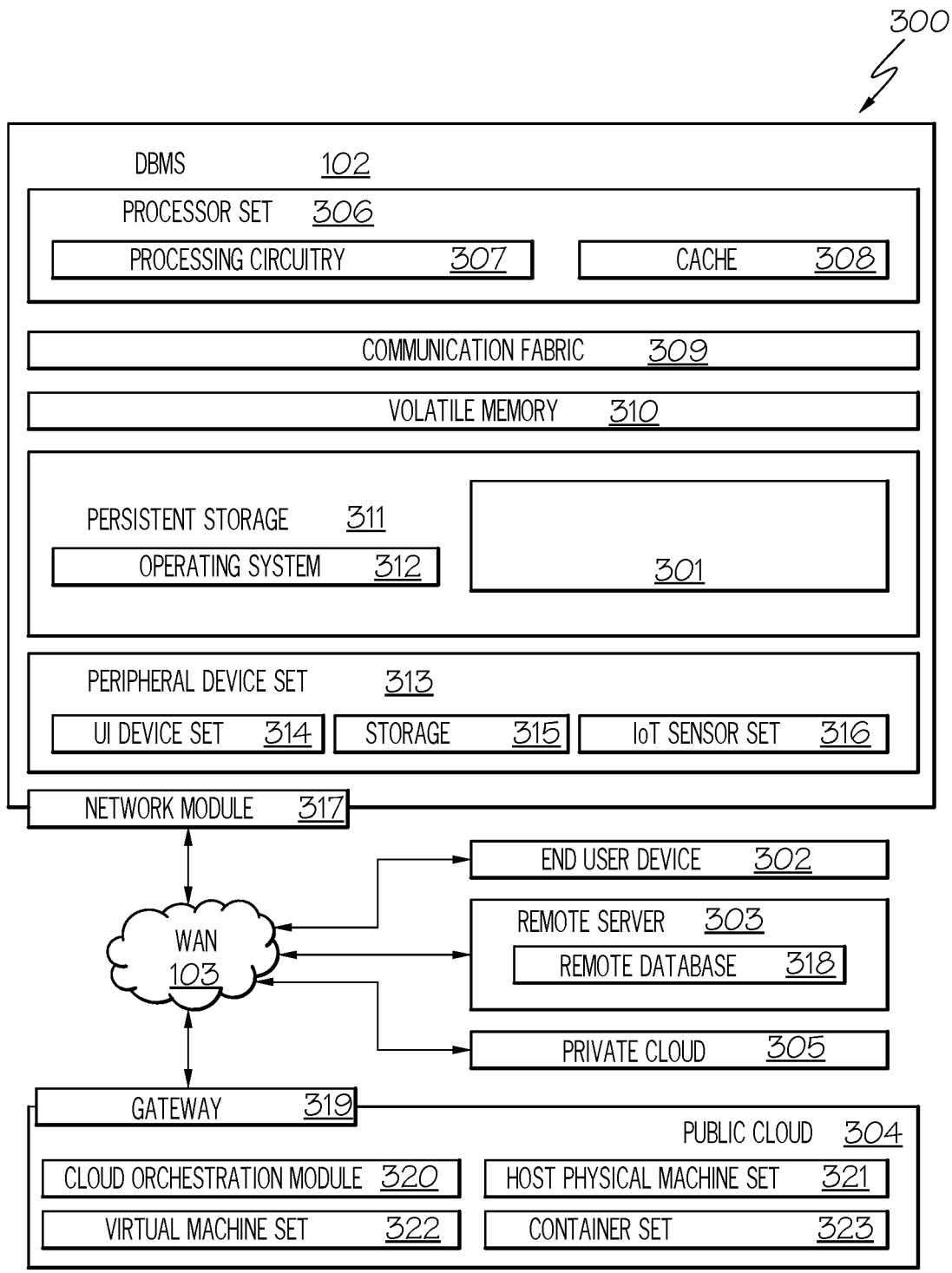
FIG. 3 illustrates an embodiment of the present disclosure of the hardware configuration of the database management system which is representative of a hardware environment for practicing the present disclosure.

Referring now to FIG. 3, in conjunction with FIG. 1, FIG. 3 illustrates an embodiment of the present disclosure of the hardware configuration of database management system (DBMS) 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code 301 involved in performing the inventive methods, such as maximizing system scalability while guaranteeing enforcement of user-specified service level objectives. In addition to block 301, computing environment 300 includes, for example, database management system 102, network 103, such as a wide area network (WAN), end user device (EUD) 302, remote server 303, public cloud 304, and private cloud 305. In this embodiment, database management system 102 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Database management system 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically database management system 102, to keep the presentation as simple as possible. Database management system 102 may be located in a cloud, even though it is not shown in a cloud in FIG. 3. On the other hand, database management system 102 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto database management system 102 to cause a series of operational steps to be performed by processor set 306 of database management system 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 308 and the other storage media discussed below. The program instructions, and associated data, are accessed by processor set 306 to control and direct performance of the inventive methods. In computing environment 300, at least some of the instructions for performing the inventive methods may be stored in block 301 in persistent storage 311.

Communication fabric 309 is the signal conduction paths that allow the various components of database management system 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In database management system 102, the volatile memory 310 is located in a single package and is internal to database management system 102, but, alternatively or additionally, the volatile memory may be distributed over multiple packages and/or located externally with respect to database management system 102.

Persistent Storage 311 is any form of non-volatile storage for computers that is now known or to be developed in the future. The non-volatility of this storage means that the stored data is maintained regardless of whether power is being supplied to database management system 102 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the inventive methods.

Peripheral device set 313 includes the set of peripheral devices of database management system 102. Data communication connections between the peripheral devices and the other components of database management system 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where database management system 102 is required to have a large amount of storage (for example, where database management system 102 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows database management system 102 to communicate with other computers through WAN 103. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the inventive methods can typically be downloaded to database management system 102 from an external computer or external storage device through a network adapter card or network interface included in network module 317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates database management system 102), and may take any of the forms discussed above in connection with database management system 102. EUD 302 typically receives helpful and useful data from the operations of database management system 102. For example, in a hypothetical case where database management system 102 is designed to provide a recommendation to an end user, this recommendation would typically be communicated from network module 317 of database management system 102 through WAN 103 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to database management system 102. Remote server 303 may be controlled and used by the same entity that operates database management system 102. Remote server 303 represents the machine(s) that collect and store helpful and useful data for use by other computers, such as database management system 102. For example, in a hypothetical case where database management system 102 is designed and programmed to provide a recommendation based on historical data, then this historical data may be provided to database management system 102 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to maximize system scalability while guaranteeing enforcement of user-specified service level objectives. In one embodiment, such components may be implemented in hardware. The functions discussed above performed by such components are not generic computer functions. As a result, database management system 102 is a particular machine that is the result of implementing specific, non-generic computer functions.

In one embodiment, the functionality of such software components of database management system 102, including the functionality for maximizing system scalability while guaranteeing enforcement of user-specified service level objectives may be embodied in an application specific integrated circuit.

As stated above, various database management systems have attempted to improve scalability via the use of multiple backend databases. Scalability is the ability to expand or contract the capacity of system resources in order to support the changes in traffic, such as changes in queries-per-second (QPS). Queries-per-second (QPS) is a measure of how much traffic a particular query server is handling at a given time. Many of these requests include user-specified service level objectives. A service level objective is a key element of a service level agreement between a service provider and a customer. A service level agreement is a commitment between a service provider and a client. For example, the service level agreement may include aspects of the service (e.g., quality, availability, responsibilities) that are agreed between the service provider and the service user. Service level objectives are agreed upon between the service provider and the customer as a means of measuring the performance of the service provider. Such service level objectives are composed of one or more service level indicators (or quality of service measurements) that are combined to produce the service level objective achievement value. Unfortunately, such database management systems cannot both improve the scalability while also simultaneously guaranteeing user-specified service level objectives.

Figure 4:
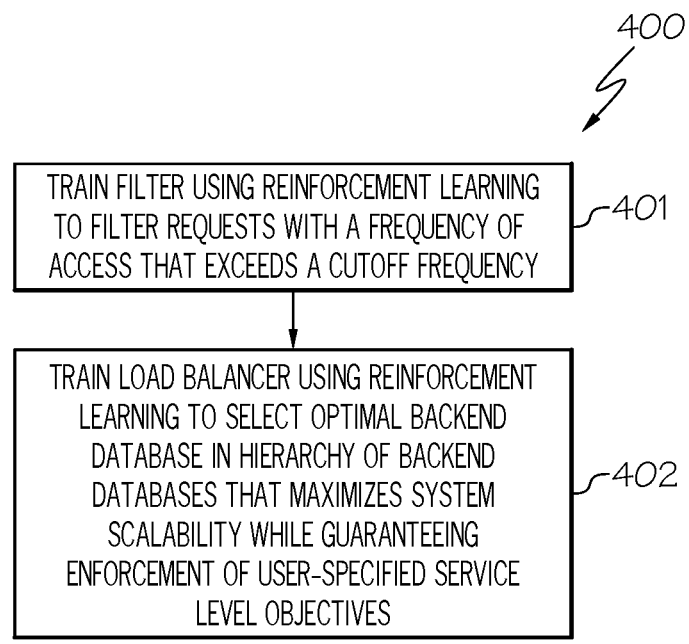
FIG. 4 is a flowchart of a method for training agents using reinforcement learning to filter requests that exceed a cutoff frequency as well as to select the optimal backend database to handle the incoming request so that scalability is improved while guaranteeing enforcement of the user-specified service level objectives in accordance with an embodiment of the present disclosure.
Figure 5:
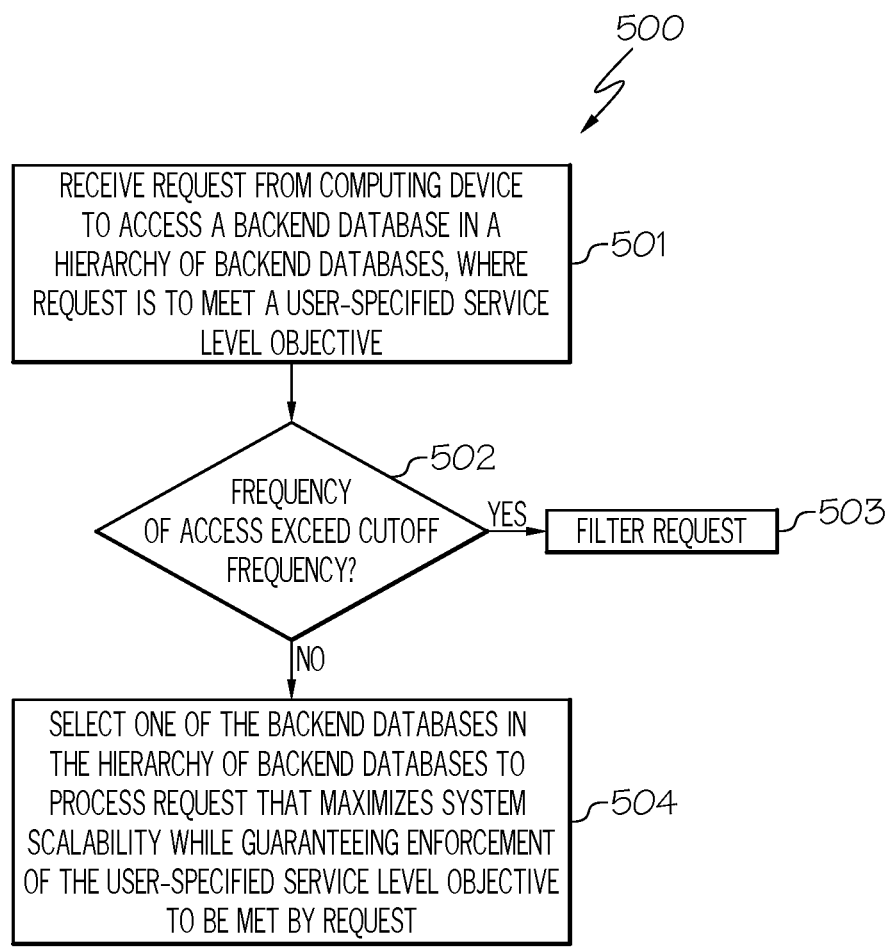
FIG. 5 is a flowchart of a method for maximizing system scalability while also simultaneously guaranteeing enforcement of user-specified service level objectives in accordance with an embodiment of the present disclosure.
Figure 6:
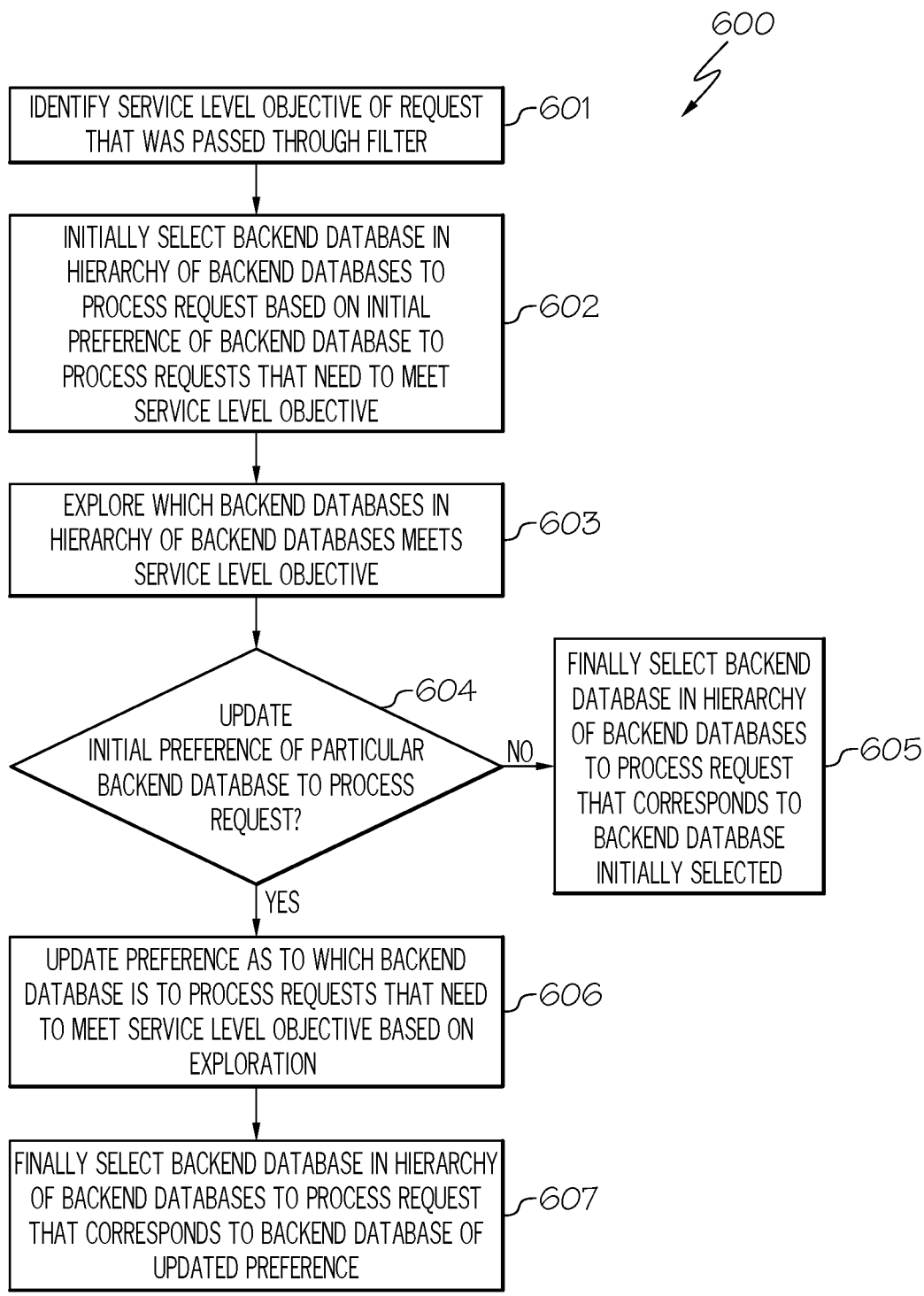
FIG. 6 is a flowchart of a method for selecting the optimal backend database in the hierarchy of backend databases using reinforcement learning in accordance with an embodiment of the present disclosure.

The embodiments of the present disclosure provide a means for both improving the system scalability while also simultaneously guaranteeing user-specified service level objectives as discussed below in connection with FIGS. 4-6. FIG. 4 is a flowchart of a method for training agents using reinforcement learning to filter requests that exceed a cutoff frequency as well as to select the optimal backend database to handle the incoming request so that scalability is improved while guaranteeing enforcement of the user-specified service level objectives. FIG. 5 is a flowchart of a method for maximizing system scalability while also simultaneously guaranteeing enforcement of user-specified service level objectives. FIG. 6 is a flowchart of a method for selecting the optimal backend database in the hierarchy of backend databases using reinforcement learning.

As stated above, FIG. 4 is a flowchart of a method 400 for training agents using reinforcement learning to filter requests that exceed a cutoff frequency as well as to select the optimal backend database to handle the incoming request so that scalability is improved while guaranteeing enforcement of the user-specified service level objectives in accordance with an embodiment of the present disclosure.

Referring to FIG. 4, in conjunction with FIGS. 1-3, in operation 401, filter trainer engine 203 of database management system 102 trains filter 201 using reinforcement learning to filter requests 202 (e.g., write requests) with a frequency of access that exceeds a cutoff frequency.

As discussed above, "frequency of access," as used herein, refers to the rate at which a request 202 (e.g., SELECT column1, column2 FROM table1, table2 WHERE column2='value') is utilized to access backend database 207.

In one embodiment, filter 201 is trained by filter trainer engine 203 of database management system 102 to filter (squash) those requests 202 (e.g., write requests) with a frequency of access that exceeds a cutoff frequency so that the bandwidth is efficiently used to support more queries. In one embodiment, such a "cutoff frequency" is automatically and dynamically tuned using reinforcement learning so as to appropriately consider both latency and congestion. The "cutoff frequency," as used herein, refers to the access rate at which those requests that exceed such an access rate are filtered or squashed so that such requests are not processed by backend storage 104. "Latency," as used herein, refers to how much time it takes for a data packet to travel from one designated point to another. "Congestion," as used herein, refers to a reduced quality of service that results when a node or link is carrying more data than it can handle. Typical effects include queueing delay, packet loss or the blocking of new connections. By learning the optimal cutoff frequency via reinforcement learning, a maximum amount of bandwidth is saved for scalability. Furthermore, using reinforcement learning, such filtered traffic satisfies the constraints imposed by the service level objectives of the requests.

As discussed above, filter 201 is trained by filter trainer engine 203 to filter (squash) those requests 202 (e.g., write requests) with a frequency of access that exceeds a cutoff frequency so that the bandwidth is efficiently used to support more queries. As a result, in one embodiment, filter 201 functions as a low pass filter. In one embodiment, infrequent updates to application programming interface (API) endpoints (point at which an API connects with the software program) are allowed to pass through filter 201. Conversely, frequent updates to API endpoints are filtered (squashed) by filter 201. In one embodiment, filter trainer engine 203 utilizes various software tools to design filter 201 to function as a low pass filter including, but not limited to, FilterLab®, Filter Solutions®, FilterPro, etc.

In one embodiment, by having a higher cutoff frequency, there is a fast convergence since more traffic is allowed to pass through filter 201 to be handled by frontend 204 as discussed herein. Conversely, by having a lower cutoff frequency, there is a slow convergence since less traffic is allowed to pass through filter 201 to be handled by frontend 204 as discussed herein.

In one embodiment, filter 201 is trained by filter trainer engine 203 to filter (squash) those requests 202 (e.g., write requests) with a frequency of access that exceeds a cutoff frequency using reinforcement learning. "Reinforcement learning," as used herein, refers to training agents, such as a reinforcement learning based filter 201, to maximize the notion of a cumulative reward. An "agent," as used herein, refers to the sole decision-maker and learner. In one embodiment, such a reward corresponds to user-specified service-level indicators. A "service-level indicator," as used herein, refers to the metric used to measure the level of service provided to end users, such as availability, latency, throughput, etc. "Service level objectives," as used herein, are the targeted levels of service, measured by service-level indicators. In one embodiment, such service level objectives are specified by the users of computing devices 101, who also specify which requests are to meet what service level objectives.

In one embodiment, database management system 102 includes a filter trainer engine 203 configured to train filter 201 using a reinforcement learning algorithm, such as Monte Carlo, Q-learning, SARSA (state-action-reward-state-action), DQN (deep Q network), DDPG (deep deterministic policy gradient), A3C (asynchronous advantage actor-critic algorithm), NAF (Q-learning and normalized advantage functions), TRPO (trust region policy optimization), PPO (proximal policy optimization), TD3 (twin delayed deep deterministic policy gradient), SAC (soft actor-critic), etc.

In one embodiment, various types of reinforcement learning may be utilized by filter trainer engine 203 to train filter 201, such as associative reinforcement learning, deep reinforcement learning, adversarial deep reinforcement learning, fuzzy reinforcement learning, inverse reinforcement learning, safe reinforcement learning, partially supervised reinforcement learning, etc. In one embodiment, the reinforcement learning algorithm utilized by filter trainer engine 203 is value-based. In a value-based approach, the goal is to maximize a value function, where the agent (filter 201) through a policy expects a long-term return of the current states. Furthermore, in one embodiment, the reinforcement learning algorithm utilized by filter trainer engine 203 is policy-based. In the policy-based approach, a strategy is developed, such as by an expert, that helps to gain maximum rewards in the future through possible actions performed in each state. Such policy-based approaches may be deterministic or stochastic. Additionally, in one embodiment, the reinforcement learning algorithm utilized by filter trainer engine 203 is model-based. In the model-based approach, a virtual model is created for the agent (filter 201) to help in learning to perform in each specific environment (where the agent learns and decides what actions to perform).

In one embodiment, in connection with training filter 201 by filter trainer engine 203 using reinforcement learning to filter requests 202 (e.g., write requests) that exceed a cutoff frequency, reinforcement learning based filter 201 corresponds to an agent that is trained using a reward and penalty mechanism. Filter 201 is trained to take the best possible action or path to gain maximum rewards and minimum penalties through observations in a specific situation. In one embodiment, filter 201 is an agent that is built to perceive and interpret the environment (where the agent learns and decides what actions to perform) in which it is placed. In one embodiment, filter 201 (agent) learns to perform a task (filter requests that exceed a cutoff frequency) through repeated trial and error interactions with the environment. Such a learning approach enables filter 201 (agent) to make a series of decisions that maximize a reward metric for the task without human intervention and without being explicitly programmed to achieve the task.

In one embodiment, filter trainer engine 203 continuously trains filter 201 as discussed above so that the cutoff frequency is continually updated (tuned) so that the maximize amount of bandwidth is saved for scalability.

In operation 402, serving logic 205 of database management system 102 trains load balancer 206 using reinforcement learning to select the optimal backend database 207 in the hierarchy of backend databases 207 that maximizes system scalability while guaranteeing enforcement of the user-specified service level objectives to be met by the request, such as a request issued by the user of computing device 101.

As stated above, serving logic 205 is configured to train load balancer 206 using reinforcement learning to dispatch requests to the appropriately selected backend database 207 in the hierarchy of backend databases 207 of backend storage 104. In one embodiment, serving logic 205 trains load balancer 206 (also referred to as "reinforcement learning based load balancer") using reinforcement learning to optimally select backend database 207 taking into consideration the storage size and speed of backend databases 207 in the hierarchy of backend databases 207 to maximize system scalability while also guaranteeing enforcement of the user-specified service level objectives. In one embodiment, serving logic 205 utilizes various software tools to design load balancer 206 to dispatch requests to the appropriately selected backend database 207 in the hierarchy of backend databases 207 of backend storage 104 including, but not limited to, Nginx®, HAProxy®, Kemp LoadMaster, ManageEngine® OpManager, etc.

As previously discussed, "reinforcement learning," as used herein, refers to training agents, such as a reinforcement learning based load balancer 206, to maximize the notion of a cumulative reward. An "agent," as used herein, refers to the sole decision-maker and learner. In one embodiment, such a reward corresponds to user-specified service-level indicators. A "service-level indicator," as used herein, refers to the metric used to measure the level of service provided to end users (e.g., availability, latency, throughput). "Service level objectives," as used herein, are the targeted levels of service, measured by service-level indicators. In one embodiment, such service level objectives are specified by the users of computing devices 101, who also specify which requests are to meet what service level objectives.

In one embodiment, serving logic 205 is configured to train load balancer 206 using a reinforcement learning algorithm, such as Monte Carlo, Q-learning, SARSA (state-action-reward-state-action), DQN (deep Q network), DDPG (deep deterministic policy gradient), A3C (asynchronous advantage actor-critic algorithm), NAF (Q-learning and normalized advantage functions), TRPO (trust region policy optimization), PPO (proximal policy optimization), TD3 (twin delayed deep deterministic policy gradient), SAC (soft actor-critic), etc.

In one embodiment, various types of reinforcement learning may be utilized by serving logic 205 to train load balancer 206, such as associative reinforcement learning, deep reinforcement learning, adversarial deep reinforcement learning, fuzzy reinforcement learning, inverse reinforcement learning, safe reinforcement learning, partially supervised reinforcement learning, etc. In one embodiment, the reinforcement learning algorithm utilized by serving logic 205 is value-based. In a value-based approach, the goal is to maximize a value function, where the agent (load balancer 206) through a policy expects a long-term return of the current states. Furthermore, in one embodiment, the reinforcement learning algorithm utilized by serving logic 205 is policy-based. In the policy-based approach, a strategy is developed, such as by an expert, that helps to gain maximum rewards in the future through possible actions performed in each state. Such policy-based approaches may be deterministic or stochastic. Additionally, in one embodiment, the reinforcement learning algorithm utilized by serving logic 205 is model-based. In the model-based approach, a virtual model is created for the agent (load balancer 206) to help in learning to perform in each specific environment (where the agent learns and decides what actions to perform).

In one embodiment, in connection with training load balancer 206 by serving logic 205 using reinforcement learning to optimally select backend database 207 taking into consideration the storage size and speed of backend databases 207 in the hierarchy of backend databases 207 to maximize system scalability while also guaranteeing enforcement of the user-specified service level objectives, reinforcement learning based load balancer 206 corresponds to an agent that is trained using a reward and penalty mechanism. Load balancer 206 is trained to take the best possible action or path to gain maximum rewards and minimum penalties through observations in a specific situation. In one embodiment, load balancer 206 is an agent that is built to perceive and interpret the environment (where the agent learns and decides what actions to perform) in which it is placed. In one embodiment, load balancer 206 (agent) learns to perform a task (select backend database 207) through repeated trial and error interactions with the environment. Such a learning approach enables load balancer 206 (agent) to make a series of decisions that maximize a reward metric for the task without human intervention and without being explicitly programmed to achieve the task.

In one embodiment, serving logic 205 continuously trains load balancer 206 as discussed above so that load balancer's initial preference as to which backend database 207 should be selected to handle request 202 is continually updated so as to maximize system scalability while also simultaneously guaranteeing user-specified service level objectives.

Upon training filter 201 to filter requests with a frequency of access that exceeds cutoff frequency and training load balancer 206 to select the optimal backend database 207 in the hierarchy of backend databases 207 as discussed above using reinforcement learning, reinforcement learning based filter 201 and reinforcement learning based load balancer 206 are utilized to maximize system scalability while also simultaneously guaranteeing enforcement of user-specified service level objectives as discussed below in connection with FIG. 5.

FIG. 5 is a flowchart of a method 500 for maximizing system scalability while also simultaneously guaranteeing enforcement of user-specified service level objectives in accordance with an embodiment of the present disclosure.

Referring to FIG. 5, in conjunction with FIGS. 1-4, in operation 501, filter 201 of database management system 102 receives a request 202 from a computing device 101 to access a backend database 207 in a hierarchy of backend databases 207 of backend storage 104, where the request is to meet a user-specified service level objective, which corresponds to a target level of service as measured by a service level indicator. A service level objective is a key element of a service level agreement between a service provider and a customer. A service level agreement is a commitment between a service provider and a client. For example, the service level agreement may include aspects of the service (e.g., quality, availability, responsibilities) that are agreed between the service provider and the service user. Service level objectives are agreed upon between the service provider and the customer as a means of measuring the performance of the service provider. Such service level objectives are composed of one or more service level indicators (or quality of service measurements) that are combined to produce the service level objective achievement value.

As stated above, reinforcement learning based filter 201 is configured to filter queries/requests 202 (e.g., write requests) issued by the user of computing device 101 based on the frequency of access. "Frequency of access," as used herein, refers to the rate at which request 202 (e.g., SELECT column1, column2 FROM table1, table2 WHERE column2='value') is utilized to access backend database 207.

In one embodiment, filter 201 is trained by filter trainer engine 203 of database management system 102 to filter (squash) those requests 202 (e.g., write requests) with a frequency of access that exceeds a cutoff frequency so that the bandwidth is efficiently used to support more queries. In one embodiment, such a "cutoff frequency" is automatically and dynamically tuned using reinforcement learning so as to appropriately consider both latency and congestion. The "cutoff frequency," as used herein, refers to the access rate at which those requests that exceed such an access rate are filtered or squashed so that such requests are not processed by backend storage 104. "Latency," as used herein, refers to how much time it takes for a data packet to travel from one designated point to another. "Congestion," as used herein, refers to a reduced quality of service that results when a node or link is carrying more data than it can handle. Typical effects include queueing delay, packet loss or the blocking of new connections. By learning the optimal cutoff frequency via reinforcement learning, a maximum amount of bandwidth is saved for scalability.

In operation 502, filter 201 of database management system 102 determines whether to filter the received request 202 based on the request's frequency of access in connection with the cutoff frequency, such as determining if the request's frequency of access exceeds the cutoff frequency.

If the request's frequency of access exceeds the cutoff frequency, then, in operation 503, filter 201 of database management system 102 filters (squashes) the request so that such a request is not processed by backend storage 104.

If, however, the request's frequency of access does not exceed the cutoff frequency, then filter 201 of database management system 102 allows such a request to pass through and be handled by frontend 204. In particular, by allowing such a request to pass through, in operation 504, reinforcement learning based load balancer 206 selects one of the backend databases 207 in the hierarchy of backend databases 207 of backend storage 104 to process request 202 that maximizes system scalability while guaranteeing enforcement of the user-specified service level objective to be met by request 202.

As discussed above, the received request passed through filter 201 is analyzed by serving logic 205 to identify the service level objective, which corresponds to a target level of service as measured by a service level indicator. Examples of such service level objectives include disaster recovery time, application availability, live communication response time, first call resolution rate, application maintenance, etc. In one embodiment, the user-specified service level objective to be met by request 202 passed through filter 201 is located in the request body (payload) where the name and description of the service level object is stored. In one embodiment, the request body is analyzed by serving logic 205 to obtain the requested service level objective. In one embodiment, serving logic 205 utilizes various software tools for identifying the user-specified service level objective in the request body, including, but not limited to, cURL, HURL.it, Postman, HTTPie, etc.

Upon identifying the user-specified service level objective to be met by request 202, reinforcement learning based load balancer 206 selects the optimal backend databases 207 in the hierarchy of backend databases 207 of backend storage 104 to process request 202 that maximizes system scalability while guaranteeing enforcement of the user-specified service level objective as discussed below in connection with FIG. 6.

FIG. 6 is a flowchart of a method 600 for selecting the optimal backend database 207 in the hierarchy of backend databases 207 using reinforcement learning in accordance with an embodiment of the present disclosure.

Referring to FIG. 6, in conjunction with FIGS. 1-5, in operation 601, serving logic 205 of database management system 102 identifies the service level objective of request 202 that was passed through filter 201.

As discussed above, in one embodiment, serving logic 205 analyzes the received request 202 passed through filter 201 to identify the service level objective, which corresponds to a target level of service as measured by a service level indicator. Examples of such service level objectives include disaster recovery time, application availability, live communication response time, first call resolution rate, application maintenance, etc. In one embodiment, the user-specified service level objective to be met by request 202 passed through filter 201 is located in the request body (payload) where the name and description of the service level object is stored. In one embodiment, the request body is analyzed by serving logic 205 to obtain the requested service level objective. In one embodiment, serving logic 205 utilizes various software tools for identifying the user-specified service level objective in the request body, including, but not limited to, cURL, HURL.it, Postman, HTTPie, etc.

In operation 602, load balancer 206 of database management system 102 initially selects a backend database 207 (e.g., backend database 207A) in the hierarchy of backend databases 207 to process request 202 based on the initial preference of such a backend database 207 to process requests 202 that need to meet the user-specified service level objective (e.g., 100 ms access latency for 99% of the queries).

As stated above, in one embodiment, load balancer 206 (reinforcement learning based load balancer) utilizes predicates (hard rules defined by an expert) in which preferences (rules managed by the reinforcement learning agent) are a particular case. In one embodiment, such a preference may correspond to initially selecting a backend database 207 to handle the request issued by the user of computing device 101 based on the user-specified service level objective as identified in the request. As discussed above, such a service level objective is identified by serving logic 205. Upon identifying the user-specified service level objective to be met by request 202 by serving logic 205, load balancer 206 may perform a look-up in the data structure for a listing of one or more backend databases 207 associated with such a service level objective. In one embodiment, such preferences may be stored in a data structure (e.g., table) that includes a listing of backend databases 207 associated with service level objectives. In one embodiment, such initial preferences are initially inputted in the data structure by an expert. In one embodiment, such a data structure resides within a storage device (e.g., storage device 311, 315) of database management system 102.

In operation 603, load balancer 206 of database management system 102 explores which backend databases 207 in hierarchy of backend databases 207 meets the service level objective, where such an exploration covers a temporal distribution of traffic.

As discussed above, in one embodiment, such an exploration covers a temporal distribution (e.g., peak hours and off-peak hours) of traffic (incoming requests 202 passed through filter 201) so that the observation of the service level indicators (quality of service measurements that are combined to produce the service level objective achievement value) are statistically significant.

In operation 604, a determination is made by load balancer 206 of database management system 102 as to whether the initial preference as to which backend database 207 is to process request 202 with the user-specified service level objective identified by serving logic 205 is to be updated.

As stated above, in one embodiment, load balancer 206 may update or not update the initial preference of the particular backend database 207 (e.g., in-memory backend database) to handle request 202 issued by the user of computing device 101 based on the user-specified service level objective identified by serving logic 205.

For example, suppose that the user specifies a service level objective for its online store web service to be 100 ms access latency for 99% of the queries, which is obtained from the request body of the request by serving logic 205. Suppose further that load balancer 206 has an initial preference of using etcd (works from memory and only stores data on disk in which the etcd stores data (both key and value) as a binary array) as backend database 207 in the hierarchy of backend databases 207 of backend storage 104 to service such a request. By exploiting the current preference, load balancer 206 finds that the initial preference meets the service level objective. By exploring, load balancer 206 learns that the PostgreSQL (open source object-relational database) backend database also meets the service level objective. The preference may then be updated for the online store service to now use PostgreSQL for better scalability. As a result, PostgreSQL is selected (final selection) as backend database 207 to handle the request. Consequently, data is migrated from the online store service from etcd to PostgreSQL.

In another example, suppose that the user specifies a service level objective for its assembly line monitoring web service to be 50 ms access latency for 99% of the queries, which is obtained from the request body of the request by serving logic 205. Suppose further that load balancer 206 has an initial preference of using PostgreSQL (open source object-relational database) as backend database 207 in the hierarchy of backend databases 207 of backend storage 104 to service such a request. By exploiting the current preference, load balancer 206 finds that the initial preference violates the service level objective. By exploring, load balancer 206 learns that the etcd (works from memory and only stores data on disk in which the etcd stores data (both key and value) as a binary array) meets the service level objective. The preference may then be updated for the assembly line monitoring service to now use etcd to meet the service level objective. As a result, etcd is selected (final selection) as backend database 207 to handle the request. Consequently, data is migrated from the assembly line monitoring service from PostgreSQL to etcd.

In one embodiment, such initial preference as to which backend database 207 is to be initially selected by load balancer 206 is continually updated using machine learning based on patterns of access to backend databases 207.

In one embodiment, serving logic 205 uses a machine learning algorithm (e.g., supervised learning) to train a machine learning model to select the initial preference as to which backend database 207 is to be selected by load balancer 206. In one embodiment, such training is based on sample data consisting of access patterns to backend databases 207 as previously determined by the reinforcement learning trained load balancer 206.

Such sample data is referred to herein as the "training data," which is used by the machine learning algorithm to make predictions or decisions as to the initial preference as to which backend database 207 is to be selected by load balancer 206. The algorithm iteratively makes predictions on the training data as to the initial preference as to which backend database 207 is to be selected by load balancer 206 until the predictions achieve the desired accuracy as determined by an expert. Examples of such learning algorithms include nearest neighbor, Naïve Bayes, decision trees, linear regression, support vector machines and neural networks.

If the initial preference as to which backend database 207 is to process request 202 with the service level objective identified by serving logic 205 is not to be updated, then, in operation 605, load balancer 206 of database management system 102 finally selects backend database 207 (e.g., backend database 207A) in hierarchy of backend databases 207 to process request 202 which corresponds to the backend database 207 that load balancer 201 initially selected in operation 602.

If, however, the initial preference as to which backend database 207 is to process request 202 with the service level objective identified by serving logic 205 is to be updated, then, in operation 606, load balancer 206 of database management system 102 updates the preference as to which backend database 207 is to process requests 202 that need to meet this particular service level objective based on the exploration (see operation 603). That is, load balancer 206 of database management system 102 updates the preference as to which backend database 207 is to process requests to meet the user-specified service level objective identified by serving logic 205 in operation 601.

In operation 607, load balancer 206 of database management system 102 finally selects backend database 207 in the hierarchy of backend databases 207 to process request 202 that corresponds to backend database 207 (e.g., backend database 207N) of the updated preference. That is, load balancer 206 of database management system 102 finally selects backend database 207 (e.g., backend database 207N) which corresponds to backend database 207 of the updated preference to process request 202 that is to meet the service level objective identified by serving logic 205 in operation 601.

In this manner, system scalability is improved while also simultaneously guaranteeing user-specified service level objectives. In particular, such system scalability is improved while also simultaneously guaranteeing user-specified service level objectives by implementing a backend storage that contains a hierarchy of backend databases. Such a hierarchy of backend databases include heterogenous computing resources with a dynamic range of performance (e.g., latency may span from microseconds to milliseconds). Furthermore, embodiments of the present disclosure improve the system scalability while also simultaneously guaranteeing user-specified service level objectives by training a load balancer using reinforcement learning to select the appropriate backend database based on speed and storage size as well as training a filter using reinforcement learning to filter (squash) those requests with a frequency greater than a cutoff frequency.

Furthermore, the principles of the present disclosure improve the technology or technical field involving database management systems controlling backend databases. As discussed above, various database management systems have attempted to improve scalability via the use of multiple backend databases. Scalability is the ability to expand or contract the capacity of system resources in order to support the changes in traffic, such as changes in queries-per-second (QPS). Queries-per-second (QPS) is a measure of how much traffic a particular query server is handling at a given time. Many of these requests include user-specified service level objectives. A service level objective is a key element of a service level agreement between a service provider and a customer. A service level agreement is a commitment between a service provider and a client. For example, the service level agreement may include aspects of the service (e.g., quality, availability, responsibilities) that are agreed between the service provider and the service user. Service level objectives are agreed upon between the service provider and the customer as a means of measuring the performance of the service provider. Such service level objectives are composed of one or more service level indicators (or quality of service measurements) that are combined to produce the service level objective achievement value. Unfortunately, such database management systems cannot both improve the scalability while also simultaneously guaranteeing user-specified service level objectives.

Embodiments of the present disclosure improve such technology by receiving a request from a computing device to access a backend database in a hierarchy of backend databases. A "backend database," as used herein, is a database that is accessed by users indirectly through an external application rather than by application programing stored within the database itself or by low level manipulation of the data. A "hierarchy" (also referred to as a "storage device hierarchy") of backend databases, as used herein, refers to a group of backend databases that have different costs for storage data, different amounts of data stored and different speeds of accessing the data. For example, the hierarchy of backend databases may include different types of databases, such as in-memory databases or traditional databases. Furthermore, the received request is to meet a user-specified service level objective which corresponds to a target level of service as measured by a service level indicator. Examples of such service level objectives include disaster recovery time, application availability, live communication response time, first call resolution rate, application maintenance, etc. In one embodiment, the service level objective to be met by the request is located in the request body (payload) of the request. Upon receiving the request, a reinforcement learning based filter determines if the request's frequency of access exceeds a cutoff frequency. The "cutoff frequency," as used herein, refers to the access rate at which those requests that exceed such an access rate are filtered or squashed so that such requests are not processed. In one embodiment, the optimal cutoff frequency is learned via reinforcement learning so that a maximum amount of bandwidth is saved for scalability. If the received request is not filtered (squashed), but instead, is passed through the filter, then one of the backend databases in the hierarchy of backend databases is selected to process the request that maximizes system scalability while guaranteeing enforcement of the user-specified service level objective to be met by the request. In one embodiment, such a selection is made by a reinforcement learning based load balancer that is trained using reinforcement learning to select the optimal backend database taking into consideration the storage size and speed of the backend databases in the hierarchy of backend databases so that systems are not locked into using a single storage backend database for all persisted data as well as taking into consideration the user-specified service level objective to be met by the request to guarantee enforcement of such a service level objective. In this manner, system scalability is improved while also simultaneously guaranteeing user-specified service level objectives. Furthermore, in this manner, there is an improvement in the technical field involving database management systems controlling backend databases.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for maximizing system scalability while guaranteeing enforcement of service level objectives comprises training a load balancer using reinforcement learning to select a backend database in a hierarchy of backend databases that maximizes system scalability while guaranteeing enforcement of a user-specified service level objective, where the hierarchy of backend databases comprises a plurality of backend databases differing in speed and size. The method further comprises receiving a request from a computing device to access a backend database in the hierarchy of backend databases, where the request is to meet a service level objective which corresponds to a target level of service as measured by a service level indicator. The method additionally comprises selecting, by the trained load balancer, one of the plurality of backend databases in the hierarchy of backend databases to process the request that maximizes system scalability while guaranteeing enforcement of the service level objective.

Furthermore, in one embodiment of the present disclosure, the method additionally comprises training a filter using reinforcement learning to filter requests with a frequency of access that exceeds a cutoff frequency.

Additionally, in one embodiment of the present disclosure, the method further comprises having user-specified service-level indicators be used as rewards to train the filter and the load balancer using the reinforcement learning.

Furthermore, in one embodiment of the present disclosure, the method additionally comprises initially selecting a first backend database of the plurality of backend databases in the hierarchy of backend databases to process the request based on an initial preference of the first backend database to process requests that need to meet the service level objective.

Additionally, in one embodiment of the present disclosure, the method further comprises exploring which databases of the plurality of backend databases in the hierarchy of backend databases meet the service level objective covering a temporal distribution of traffic.

Furthermore, in one embodiment of the present disclosure, the method additionally comprises updating the initial preference as to which backend database of the plurality of backend databases in the hierarchy of backend databases is to process requests that need to meet the service level objective based on the exploration.

Additionally, in one embodiment of the present disclosure, the method further comprises having the hierarchy of backend databases comprise a plurality of shims, where each of the plurality of shims is associated with a backend database in the hierarchy of backend databases.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for maximizing system scalability while guaranteeing enforcement of service level objectives, the method comprising:
   training a load balancer to select a backend database in a hierarchy of backend databases, wherein said hierarchy of backend databases comprises a plurality of backend databases differing in speed and size;
   receiving a request from a computing device to access a backend database in said hierarchy of backend databases; and
   selecting, by said trained load balancer, one of said plurality of backend databases in said hierarchy of backend databases to process said request.

2. The method as recited in claim 1 further comprising:
   training a filter to filter requests with a frequency of access that exceeds a cutoff frequency.

3. The method as recited in claim 2, wherein user-specified service-level indicators are used as rewards to train said filter and said load balancer using reinforcement learning.

4. The method as recited in claim 3, wherein said request is to meet a service level objective, wherein the method further comprises:
   initially selecting a first backend database of said plurality of backend databases in said hierarchy of backend databases to process said request based on an initial preference of said first backend database to process requests that need to meet said service level objective.

5. The method as recited in claim 4 further comprising:
   exploring which databases of said plurality of backend databases in said hierarchy of backend databases meet said service level objective covering a temporal distribution of traffic.

6. The method as recited in claim 5 further comprising:
   updating said initial preference as to which backend database of said plurality of backend databases in said hierarchy of backend databases is to process requests that need to meet said service level objective based on said exploration.

7. The method as recited in claim 1, wherein said hierarchy of backend databases comprises a plurality of shims, wherein each of said plurality of shims is associated with a backend database in said hierarchy of backend databases.

8. A computer program product for maximizing system scalability while guaranteeing enforcement of service level objectives, the computer program product comprising one or more computer readable storage mediums having program code embodied therewith, the program code comprising programming instructions for:
   training a load balancer to select a backend database in a hierarchy of backend databases, wherein said hierarchy of backend databases comprises a plurality of backend databases differing in speed and size;
   receiving a request from a computing device to access a backend database in said hierarchy of backend databases; and
   selecting, by said trained load balancer, one of said plurality of backend databases in said hierarchy of backend databases to process said request.

9. The computer program product as recited in claim 8, wherein the program code further comprises the programming instructions for:
   training a filter to filter requests with a frequency of access that exceeds a cutoff frequency.

10. The computer program product as recited in claim 9, wherein user-specified service-level indicators are used as rewards to train said filter and said load balancer using reinforcement learning.

11. The computer program product as recited in claim 10, wherein said request is to meet a service level objective, wherein the program code further comprises the programming instructions for:
   initially selecting a first backend database of said plurality of backend databases in said hierarchy of backend databases to process said request based on an initial preference of said first backend database to process requests that need to meet said service level objective.

12. The computer program product as recited in claim 11, wherein the program code further comprises the programming instructions for:
   exploring which databases of said plurality of backend databases in said hierarchy of backend databases meet said service level objective covering a temporal distribution of traffic.

13. The computer program product as recited in claim 12, wherein the program code further comprises the programming instructions for:
   updating said initial preference as to which backend database of said plurality of backend databases in said hierarchy of backend databases is to process requests that need to meet said service level objective based on said exploration.

14. The computer program product as recited in claim 8, wherein said hierarchy of backend databases comprises a plurality of shims, wherein each of said plurality of shims is associated with a backend database in said hierarchy of backend databases.

15. A system, comprising:
   a memory for storing a computer program for maximizing system scalability while guaranteeing enforcement of service level objectives; and
   a processor connected to said memory, wherein said processor is configured to execute program instructions of the computer program comprising:
      training a load balancer to select a backend database in a hierarchy of backend databases, wherein said hierarchy of backend databases comprises a plurality of backend databases differing in speed and size;
      receiving a request from a computing device to access a backend database in said hierarchy of backend databases; and
      selecting, by said trained load balancer, one of said plurality of backend databases in said hierarchy of backend databases to process said request.

16. The system as recited in claim 15, wherein the program instructions of the computer program further comprise:
   training a filter to filter requests with a frequency of access that exceeds a cutoff frequency.

17. The system as recited in claim 16, wherein user-specified service-level indicators are used as rewards to train said filter and said load balancer using reinforcement learning.

18. The system as recited in claim 17, wherein said request is to meet a service level objective, wherein the program instructions of the computer program further comprise:
   initially selecting a first backend database of said plurality of backend databases in said hierarchy of backend databases to process said request based on an initial preference of said first backend database to process requests that need to meet said service level objective.

19. The system as recited in claim 18, wherein the program instructions of the computer program further comprise:
   exploring which databases of said plurality of backend databases in said hierarchy of backend databases meet said service level objective covering a temporal distribution of traffic.

20. The system as recited in claim 19, wherein the program instructions of the computer program further comprise:
   updating said initial preference as to which backend database of said plurality of backend databases in said hierarchy of backend databases is to process requests that need to meet said service level objective based on said exploration.

* * * * *